(12) United States Patent
Schwenke et al.

(10) Patent No.: US 6,457,298 B1
(45) Date of Patent: Oct. 1, 2002

(54) METHOD DEVICE FOR TRANSPORTING, CONTROLLING, FILLING AND SEALING A SACK

(75) Inventors: Dieter Schwenke, Schenefeld; Robert Oster, Bornheim, both of (DE)

(73) Assignee: Chronos Holdings Limited, Bestwood (GB)

( * ) Notice: Subject to any disclaimer, the term of this patent is extended or adjusted under 35 U.S.C. 154(b) by 0 days.

(21) Appl. No.: 09/391,950

(22) Filed: Sep. 8, 1999

(30) Foreign Application Priority Data

Sep. 8, 1998 (DE) .......................... 198 40 793

(51) Int. Cl.[7] .............. B65B 3/04; B65B 43/26
(52) U.S. Cl. .......................... 53/459; 53/469
(58) Field of Search ............. 53/458, 469, 485, 53/491, 136.5, 175, 449, 377.2, 377.3, 564, 574, 579; 141/114, 284

(56) References Cited

U.S. PATENT DOCUMENTS

| | | | | |
|---|---|---|---|---|
| 1,618,440 A | * | 2/1927 | Kimbsll | 53/377.2 |
| 1,627,363 A | * | 5/1927 | Webster | 53/136.5 |
| 2,255,975 A | * | 9/1941 | Hultkrans | 53/449 |
| 2,277,289 A | * | 3/1942 | Bergstein | 53/377.2 |
| 2,320,581 A | * | 6/1943 | First | 141/114 |
| 2,726,499 A | * | 12/1955 | Fischer | 53/175 |
| 3,254,469 A | * | 6/1966 | Dilot | 53/491 |
| 3,431,703 A | * | 3/1969 | Miller | 53/564 |
| 3,483,803 A | * | 12/1969 | Back | 53/577.2 |
| 3,485,008 A | * | 12/1969 | Silver | 53/491 |
| 3,589,248 A | * | 6/1971 | Lense | 493/75 |
| 3,753,333 A | * | 8/1973 | Derderian | 53/564 |
| 3,753,837 A | * | 8/1973 | Lense | 53/577.2 |
| 4,854,353 A | * | 8/1989 | Russell | 53/284 |

* cited by examiner

Primary Examiner—John Sipos
(74) Attorney, Agent, or Firm—Howard M. Ellis

(57) ABSTRACT

The invention relates to a method and an apparatus for transporting, testing, filling and sealing a bag which is comprised of a bag body that can be spread out to form a rectangular cross section, said bag body being made up of two wider first and two narrower second bag walls, a bag bottom sealing the bag body at the bottom, a bag opening bordering the bag body at the top, and an opened bag seal, whereby the bag seal itself comprises first sealing flaps which are connected to the first bag walls respectively and stick out horizontally from the bag opening outwards, and towards the first bag walls at right angles, second sealing flaps which are connected to the second bag walls respectively and which lie—especially when folded inwards onto the bag opening—horizontally so that the first sealing flaps and the second sealing flaps form a frame-shaped sealing collar lying on a horizontal plane, by which during transporting, testing, filling and sealing the outer areas of the first sealing flaps are held by means of propelling conveying means.

17 Claims, 7 Drawing Sheets

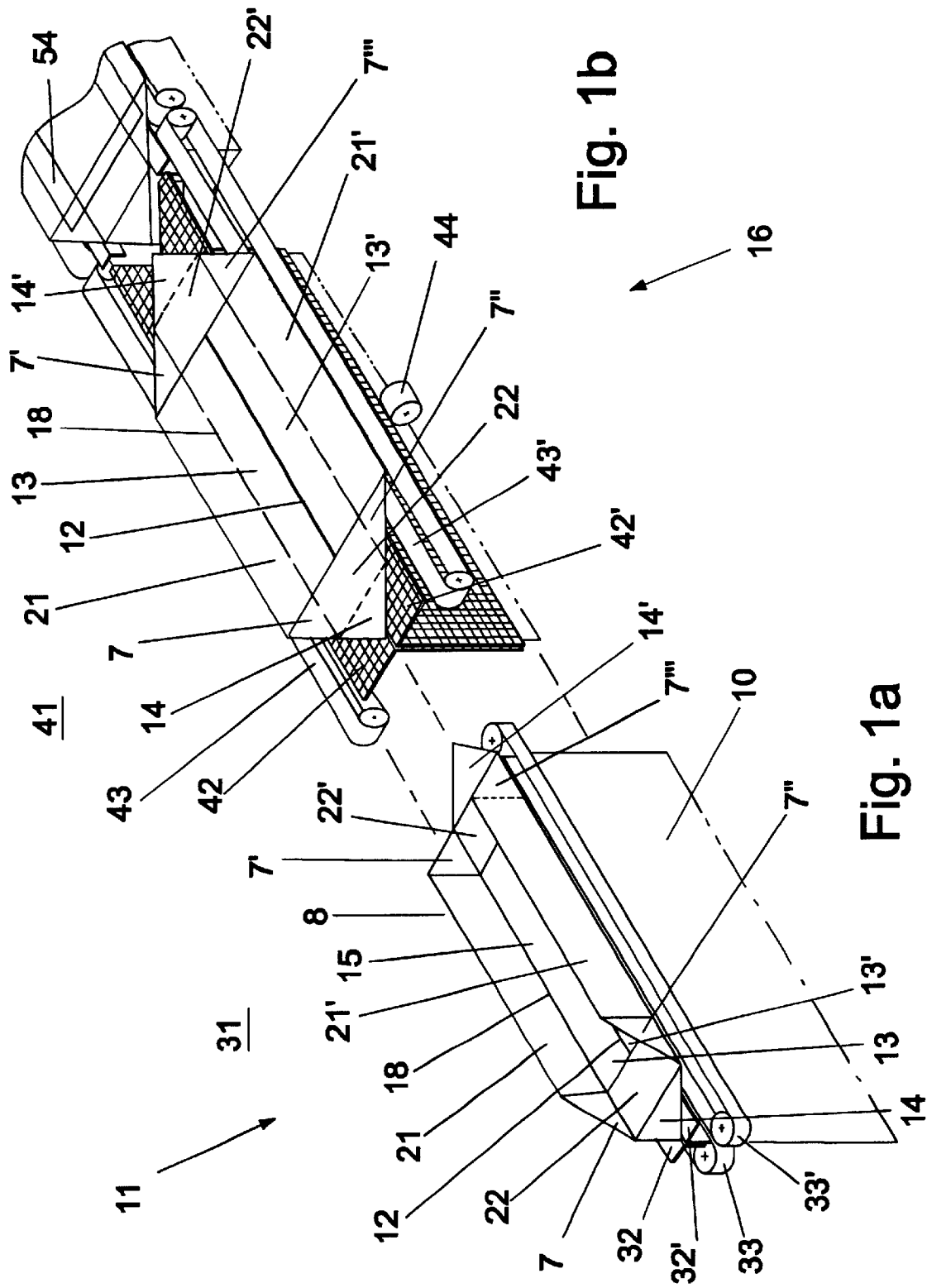

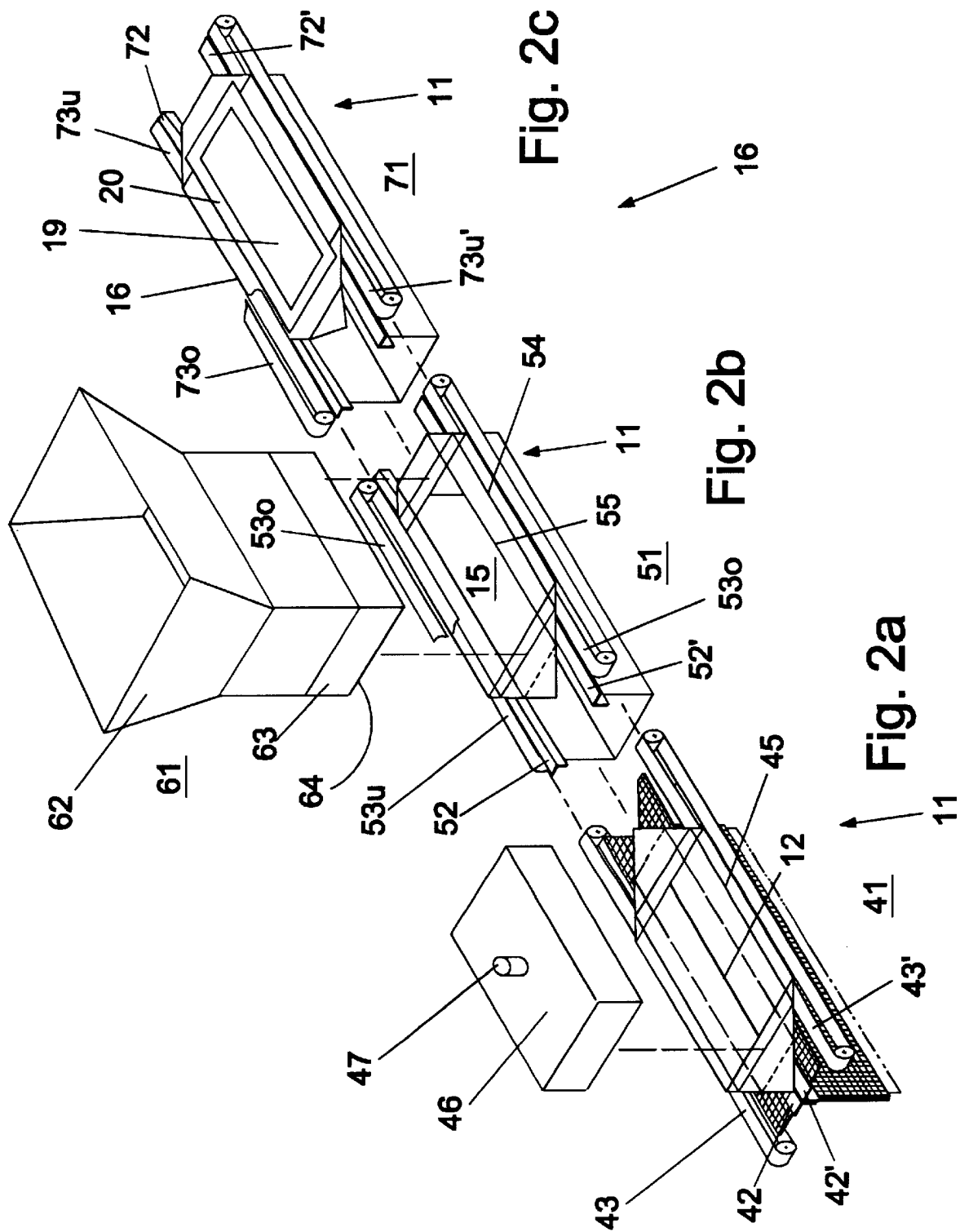

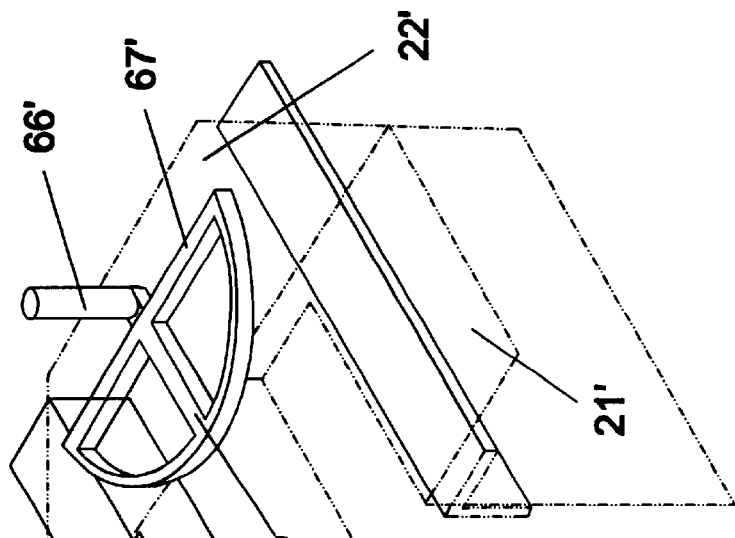
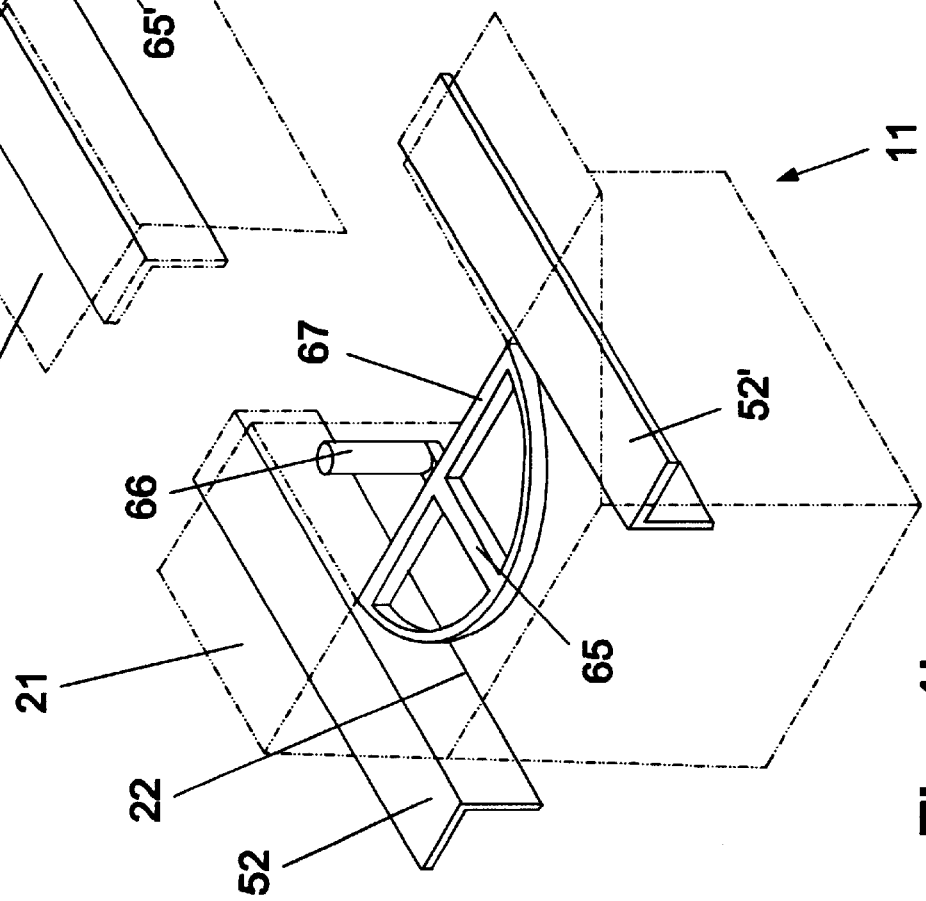
Fig. 4a
Fig. 4b

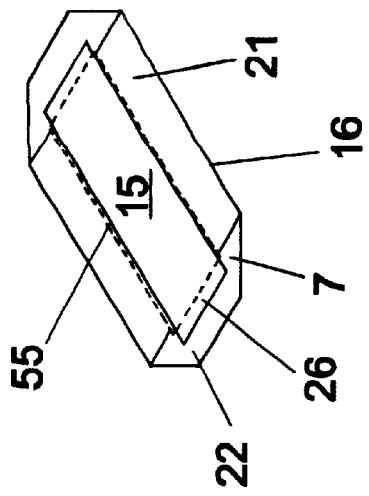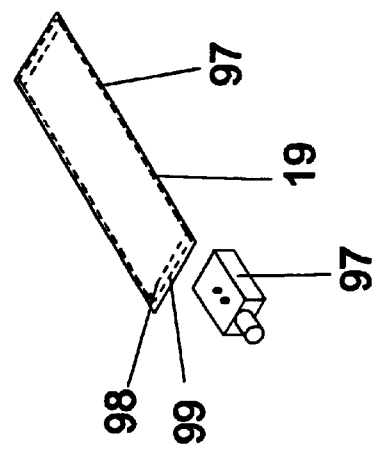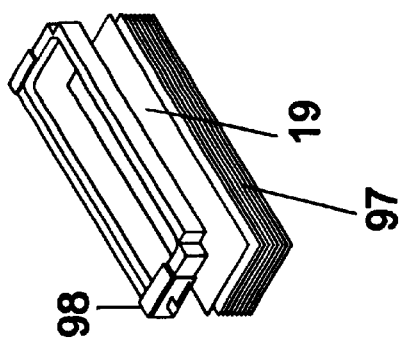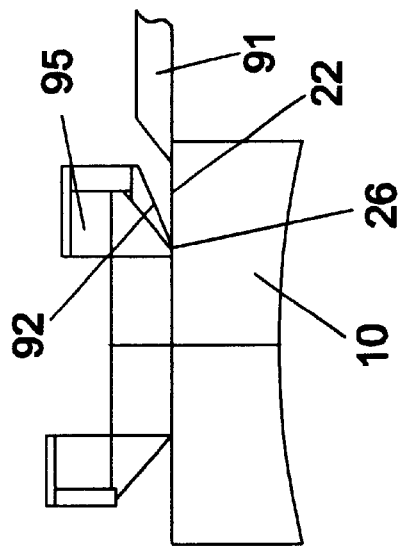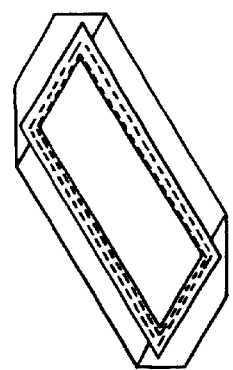

METHOD DEVICE FOR TRANSPORTING, CONTROLLING, FILLING AND SEALING A SACK

DESCRIPTION

The invention relates to a method for transporting, checking, filling and sealing a bag which is comprised of a bag body that can be spread out to form a rectangular cross section, said bag body being made up of two wider first and two narrower second bag walls, a bag bottom sealing the bag body at the bottom, a bag opening bordering the bag body at the top, and an opened bag seal, whereby the bag seal itself comprises first sealing flaps which are connected to the first bag walls respectively and stick out horizontally from the bag opening outwards, and towards the first bag walls at right angles, second sealing flaps which are connected to the second bag walls respectively and which lie—especially when folded inwards onto the bag opening—horizontally so that the first sealing flaps and the second sealing flaps form a frame-shaped sealing collar lying on a horizontal level.

The bag is designed in particular to be filled with pulverized filling products. The process of filling pulverized filling products into bags and the subsequent sealing of the bag seals brings to light several problems which will be covered in the following. In this connection, particularly for paper bags, hot melting glue is usually applied to the sealing surfaces for the purpose of sealing, and glued together or, in the case of bags made from thermoplastic foils, sealing surfaces lying on top of each other are thermally welded together.

One problem is presented by the formation of dust which is difficult to suppress during the filling process leading to the soiling of the plant and working place stress and even to the risk of dust explosions. This formation of dust must therefore be kept as low as possible.

In order to keep the formation at a bearable level valve bags are widely used in which a valve sleeve is glued in one end of a cross bottom element. The disadvantage of such bags lies in the reduced filling speed which is limited by the valve cross section in which a filler neck with a diameter of few centimeters is integrated. In addition the manufacturing and recycling is more costly due to the use of additional valve sleeves.

When open-mouthed bags are being used the filling speed can be increased however the entire sealing surfaces are dust covered after the filling process so that the sealing is not always effected faultlessly.

A second problem lies in the fact that the area of the bag seal is inevitably covered by a layer of dust. A dust covered surface impedes the gluing process using hot melting glues as well as the welding of the surfaces of thermoplastic foils.

A further problem arises in that bags filled with pulverized filling products which are sealed after the filling process for example by folding over, have micro openings at the folding corners which in turn are connected to the bag interior via channels out of which filling products can spill and through which insect pests can gain access especially in the case of food stuffs.

This being the basis it is the aim of the present invention to provide a method for transporting, testing, filling and sealing a bag which can be conducted with a most extensive suppression of formation of dust and allows a sealing of the bag which is not influenced by the formation of dust.

The solution for this lies in the properties of the independent procedure and device claims. These are based on a bag which is comprised of a bag body that can be spread out to form a rectangular cross section, said bag body being made up of two wider first and two narrower second bag walls, a bag bottom sealing the bag body at the bottom, a bag opening bordering the bag body at the top, and an opened bag seal, whereby the bag seal itself comprises first sealing flaps which are connected to the first bag walls respectively and stick out horizontally from the bag opening outwards, and towards the first bag walls at right angles, second sealing flaps which are connected to the second bag walls respectively and which lie—especially when folded inwards onto the bag opening—horizontally so that the first sealing flaps and the second sealing flaps form a frame-shaped sealing collar lying on a horizontal level. A preferred embodiment and method for manufacturing such a bag is described in the patent application of Chronos Richardson GmbH lodged at the same time. An essential feature of the aforementioned method is the fact that the first sealing flaps are held in place by propelling conveying means during transport, testing, filling and sealing of the bag so that the bag can be kept suspended freely by these. This applies especially to the filling of the bag. Inside the transport means which is particularly comprised of conveyor belt pairs, guide profiles or guide beads can support the parts of the aforementioned sealing collar which are positioned horizontally.

A procedure and a device for testing a bag stands out because of the fact that the flattened bag body is kept in its flattened shape betweep large-surface air permeated angle brackets and that a pressure joint is tightly put onto the essentially horizontally positioned sealing collar with a clearance to the bag opening whereby compressed air is supplied for test purposes via the bag openings. If an excessive pressure drop occurs at the pressure joint the first sealing flaps will be released by the transport means and the faulty bag is ejected.

A new method and a special apparatus for filling operations are characterized by a filler neck which has sealing compounds running along the edge of the bag opening enclosing the opening which are placed on the sealing collar being positioned essentially horizontally before the filling products are transferred into the bag. Therefore the sealing collar is kept free of filling products and especially dust for the purpose of a later sealing process. A special procedure and a corresponding apparatus for sealing the filled bag in the first step is characterized in that a cover sheet which is to be glued onto the area previously kept dust free by the filler neck, or welded to the sealing collar, is placed on the essentially horizontal sealing collar. In this connection it is also essential that the sealing collar lies on a plain surface whereby a cover sheet having been placed for example in such a way that it can be unrolled, or in a level configuration, is "sealed" circumferentially with the dust free area.

The final folding of the bag seal can be effected in further steps using further sealing devices.

In the following details of the devices and the method according to the invention are described in more detail using the description of embodiments.

Preferred embodiments of the apparatus according to the invention by which the method according to the invention for transporting, testing, filling and sealing a special bag is discussed in detail, are shown in the following drawings.

FIG. 1 shows two stations of the apparatus according to the invention in a perspective view
  a) a station for guiding a bag into the apparatus,
  b) a station for testing a bag in the apparatus.

FIG. 2 shows several stations of the apparatus according to the invention in a perspective view a) a station for testing a bag in the apparatus (partial view), b) a station for filling a bag using a filler neck shown next to it, c) a station for placing a cover sheet onto a filled bag (partial view)

FIG. 4 shows parts of the station for filling according to FIG. 2b in a perspective view a) with movable means of support of the filler neck in a upwards retracted position, b) with movable means of support of the filler neck in a downward position having been brought forward which is turned in under the sealing collar.

FIG. 7 shows parts of a first sealing station a) with a holding frame for separating a cover sheet, b) with a double jet for gluing of a cover sheet, c) with a prepared sealing collar of a bag, d) with the cover sheet having been placed on the sealing collar, e) with means of support for double-layered sealing rails.

Figure 3A:
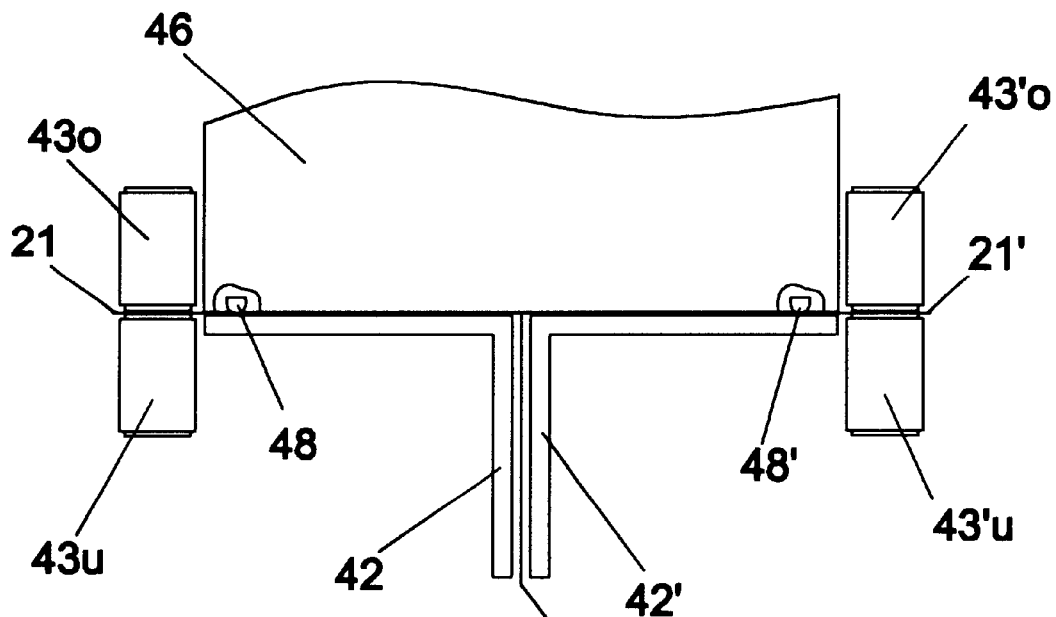
FIG. 3 shows parts of the station for testing a) as a cross section through the apparatus, b) as a longitudinal section through the apparatus.

In FIG. 1a) a feeder station of an apparatus according to the invention is shown in which a bag 11 is held in a first configuration. This bag comprises a flattened bag body 10 whose lower part, in particular its closed bottom part is not illustrated. The bag body 10 forms a slot-shaped opening 12 at the top and on both sides towards the opening 12 are visible strips 13, 13' which are still part of the bag body. These strips 13, 13' protrude at right angles from the flattened bag body 10 to both sides. They are limited by a binding edge 18 which lies on a plane forming a rectangle separating the parts of the bag body 10 from the parts of the bag seal 8. This is formed by first sealing flaps 21, 21' which are situated outside the binding edge 18 and protrude at right angles away from the plane of the strips 13, 13', as well as by second sealing flaps 22, 22' which are situated inside the binding edge 18 and are folded onto the plane of the strips 13, 13'. Outside the binding edge 18 final gussets 14, 14' which also represent part of the bag body, follow the second seal flaps 22, 22'. The parts of the bag seal 8, i.e. the first and second sealing flaps, together form double-layered sealing rails 7, 7', 7'', 7''' which are limited on the outside by a crease border 25 at the crossover of the first seal gussets 21 to the second seal flaps 22. At each of the four corners there are sealing gussets 7 and crease borders 25. The parts of the feeder station 31 to be described in the following are just like the parts of the following stations also essentially symmetrical to the plane area defined by the flattened bag body 10 and are manufactured in double, in particular, with the exception of some functional parts lying above the bag opening. The feeder station 31 comprises a pair of guide profiles 32, 32' which support the strips 13, 13' of the bag body by means of upper surface sections. Below the profiles which jointly guide the bag body 10, a pair of conveyor belts 33, 33' is shown each consisting of pairs of deflection rollers which are not individually designated and continuous loops which for the deflection rollers vertical axes of rotation affect the bag body below the guide profiles 32 and enable the feeder process of a bag into the feeder station and the forward feed of a bag out of the feeder station to the following station. In the testing station 41 following the feeder station, a bag 11 with essentially matching configuration to the one in the feeder station is shown however the first sealing flaps 21 are each folded towards the outside into the plane area of the strips 13. Thus a horizontally positioned circumferential sealing collar 16 is created which is formed by the first sealing flaps 21, 21', the second sealing flaps 22, 22' and the seal gussets 7, 7', 7'', 7'''. The sealing collar 16 encloses the bag opening 15, which is still closed by the strips 13, 13'. Within this sealing collar both strips 13, 13' are still lying on both sides of the slot-shaped opening 12, as well as the final gussets 14, 14' outside the sealing collar 16. The station comprises angle brackets 42, 42' made from perforated plates and grills which are in turn positioned in pairs symmetrically such that their horizontal shanks support the strips 13 and the vertical shanks enclose the flattened bag body 10 between each other. The vertical shanks also here are not displayed in their complete form like the bag body. They are however developed downwards to the extent that they support the entire bag body. The transfer of the first sealing flaps 21 from the vertical into the horizontal position can be effected by the stationarily installed deflection shoes which are located between the two stations. The testing station 41 comprises furthermore pairs of conveyor belts on both sides of the angle brackets of which only lower conveyor belts 43, 43' respectively are shown which are located directly below the first sealing flaps 21, whereby the not denoted deflection rollers are arranged on a horizontal axis. In addition to the conveyor belts shown, complementary pairs of conveyor belts situated above have to be assumed which are each placed immediately above the first sealing flaps 21 so that the pairs of conveyor belts can affect the first sealing flaps 21, 21' in pairs on both sides of the support profiles in such a way that a bag is fed into and then moved out of the testing station. As an additional element which is not shown here the testing station comprises a pressure joint which has essentially the shape of a cuboid-shaped box open at the bottom, and to which compressed air can be supplied from the rear side. The lower open, rectangular area is equipped with a sealing edge which can be placed along the following filling station 51 according to the line of contact situated inside the sealing collar 16, for a filler neck. Once the compressed air supply has ceased the bag is held essentially in shape by the angle brackets 42. Leakages in the bag body would be recognizable by a pressure drop in the pressure joint. In such a case the marginally more movable pressure joint would be raised, and the angle brackets 42 and conveyor belts 43 symmetrical to the bag would be separated from each other horizontally, and the respective upper and lower conveyor belts of the pairs of conveyor belts would be separated from each other on both sides in perpendicular direction so that as a result the bag would be discharged downwards from the testing station under the influence of its own weight. A pair of the discharge rollers affecting the bag of which only one discharge roller 44 is visible, can support this action as an additional safety measure. After the completion of the testing process faultless bags are then transported further towards the indicated filling station 51 by means of the conveyor belts.

In FIG. 2a) a testing station 41' is shown in a modified embodiment in comparison to FIG. 1. The angle brackets 42 feature transfer sections at their rear ends seen in conveyor direction which separate from each other in a y-shaped manner. The angle brackets are completed by grills which are only indicated under the strips 13 of the bag and on both sides of the bag body. The conveyor belts 43, 43' are situated on both sides of the angle brackets 42 and are provided in double in pairs whereby the axes of their deflection rollers are positioned horizontally. In this respect the arrangement and functionality corresponds to the conveyor belts described in connection with the testing station 41 in FIG. 1. However, only the respective lower conveyor belts of the pairs of conveyor belts are shown. The bag has the same configuration as in the testing station according to FIG. 1 therefore the description there is referred to. Details are not denoted here. Above the sealing collar 16 which shows a drawn contact and sealing line a pressure joint 46 shown in an elevated position, with a compressed-air piping. From the position of the sealing line 45 it can be seen that the seals provided at the pressure joint are supported from below, and the pressure joint surrounds the bag opening 15 for the pressure test with a clearance. Subsequent to the testing station 41' a filling station 51 is shown in conveyor direction in FIG. 2b; this station features guide profiles 52, 52' being separated by a certain clearance which are located immediately inside the conveyor belt pairs 53, 53' and which have the same clearance from each other as the conveyor belts 43, 43' of the testing station 41. The conveyor belts are therefore again affecting the first sealing flaps. The guide profiles 52 which are located on the inside of these only support the inner sections of the first sealing flaps. Inside the sealing collar 16 of the bag positioned inside the station a contact line 54 is drawn which matches the circumferential line of a filler neck 61 belonging to filling station 51. This filler neck is shown as being away from the sealing collar overly far in a vertical direction while in actual fact only a marginal lifting motion of the filler neck 61 is possible. In the position designed for the filling process the contact edge 64 is also placed onto the contact line 54 while the filler neck 61 is lifted by a small margin from the sealing collar for transport purposes so that a filled bag can be transferred to the following first sealing station 71 and a further bag can be fed from the testing station 41'. The filler neck 61 is only shown in principal and comprises a feeding hopper 62 and an essentially cuboid-shaped nozzle 63 being open above and below whereby flap mechanisms can be positioned between the two parts mentioned. By releasing a filling quantity into the filler neck or from the filler neck/s the slot-shaped opening 12 is opened completely and at the same time first side walls 1 and second side walls 2 are being shaped at the bag 11 whereby the bag body 10 takes on a rectangular cross section shape and the bag is fully spread out. On the conveyor belts 53 upper conveyor belts 53o are partially shown apart from lower conveyor belts 53u so that it becomes clear here how bag 11 is guided and held between the pairs of conveyor belts. The retention forces of the pairs of conveyor belts are preferably designed in such a way that during and after the filling process the bag can be held suspended freely in the filling station 51, i.e. the bag bottom does not need to be supported. This offers the advantage that bags of different lengths can be filled in the same filling station. Within the contact edge 64 which places itself onto the contact line 54 of the sealing collar, the nozzle 63 features a sealing edge being separated from it by a certain clearance, which is placed on a sealing line immediately at the opening edge of the bag opening 15. Thereby it is ensured that the area of the sealing collar 16 between the bag opening 15 and the contact line 54 is kept free from filling products during the filling process, i.e. particularly free from the formation of dust.

Following the filling station 51 a first sealing station 71 is shown in conveyor direction which features guide beads 72, 72' and pairs of conveyor belts 73, 73' in the same configuration as in the filling station 51. On the conveyor belts 73 upper conveyor belts 73o partially working together with lower conveyor belts 73u are also shown here. A cover sheet 19 is placed onto the bag opening, on which a sealing edge 20 is marked which essentially comprises the area previously kept free from dust, between the sealing edge on the bag opening and the contact line 54. After the first sealing station 71 a second sealing station can follow whereby deflection shoes can be provided between the sealing stations which can transfer the sealing flaps into the position shown in FIG. 1a) and can even fold these on top of each other subsequent to a gluing process, if necessary.

In FIG. 3a) a cross section through the testing station is shown while the bag is still flattened as is the case for testing. The pairs of angle brackets 42, 42' and the pairs of conveyor belts 43o, 43u, 43'o, 43'u are visible as components of the testing station already mentioned previously. The angle brackets support with their upper shanks the inner parts of the first sealing flaps and the strips 13 of the bag body. The vertical shanks of the angle brackets hold the bag body close together. From the pressure joint 46 first longitudinal seals 48 being positioned along the contact and sealing line are visible which therefore lie in the approximate center on the sealing flaps 21, 21' which continue until between the conveyor belts.

Figure 3B:
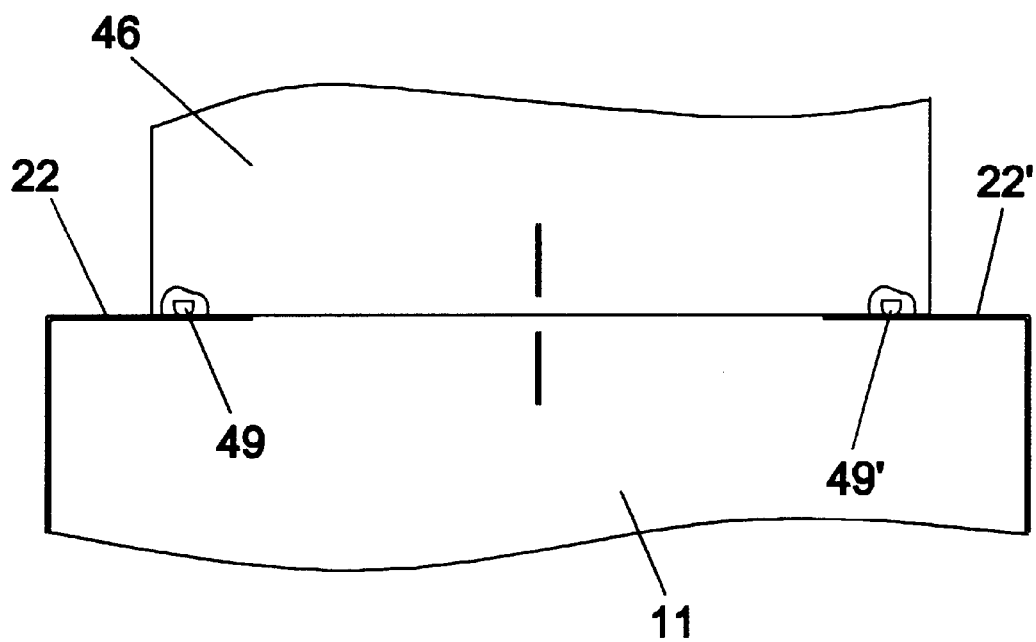

In FIG. 3b an longitudinal section through a bag in the testing station is shown whereby the second sealing flaps 22, 22' pointing inwards are cut. At the pressure joint 46 longitudinal seals 49, 49' are visible which are located immediately inside the contact and sealing edge of the pressure joint.

In FIG. 4 both support elements 65, 65' belonging to a filler neck 61 together with the respectively associated lifting and pivot pins 66, 66' are shown with respect to the bag opening 15 of a bag shown broken off and which is inside the station in different positions. In FIG. 4a) the cut through support element 65 of half-washer shape is situated above the sealing collar 16 and above the bag opening 15. In FIG. 4b) the support element 65 is lowered in such a way that the cut through support element 65 of half-washer is positioned lower than the level of the sealing collar 8, i.e. with its upper side in the plane area spread out by the guide profiles 53, 52'. By turning the support element 65 by 180° after lowering it, it is shifted under one of the second sealing flaps 22. Although the bag is shown here in its already completely opened position the positioning of the support elements by lowering and turning by 180° has already been effected in the configuration, shown for example in FIG. 2a) of the bag, in which the bag is transferred to the filling station 51. The strips 13, 13' are thereby only being pushed slightly downwards without incidentally changing the shape of the bag essentially on to the cross web 67 in the position shown in FIG. 4b) a seal edge is lowered from above to come in contact with the second sealing flaps 22 situated in between. The embodiment in half-washer shape allows it to be screwed in from the position according to FIG. 4a) to the support position according to FIG. 4b). However, for the appropriate blade-shaped embodiment the lowering and horizontal shifting motion of a support element is also possible.

Figure 5A:
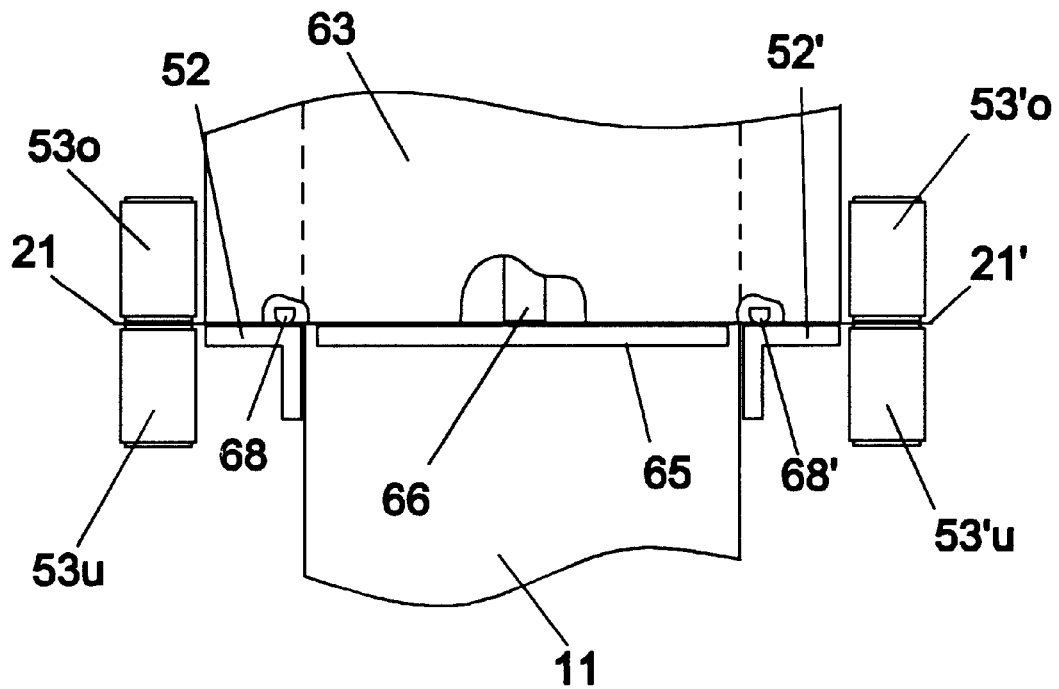
FIG. 5 shows parts of the station for filling according to FIG. 2b a) as a cross section through the apparatus in the position according to FIG. 3b, b) as a longitudinal section with details according to FIGS. 3a and 3b.

In FIG. 5a) a cross section through the filling station is shown for a bag 11 already completely spread out as it is shaped during the filling process. The pairs of guide profiles 52, 52' and the pairs of conveyor belts 53o, 53u, 53'o, 53'u are visible as components of the filling station already mentioned previously. The guide profiles 52 support with their upper shanks the inner parts of the first sealing flaps 21, 21'. The conveyor belts 53 press and hold the outer areas of the first sealing flaps 21, 21'. From the filler neck 61 the essentially parallel sided nozzle 63 with its contact edge is visible. In cut-away areas, longitudinal seals 68 which position themselves on the areas of the sealing flaps 21, 21' being supported by the guide profiles 52, are shown located immediately next to the edge of the bag opening 15. The parts of the first sealing flaps are therefore sealed against admission of filling products during the filling process. The nozzle 63 is double-walled as shown so that the free inner cross section of the nozzle 63 corresponds to the cross section of the bag opening. Furthermore the support element 65 with the trunnion 66 is shown in the position lowered underneath the second sealing flap as known from FIG. 4a) whereby the surface lies on the same level as the surface of the guide profile 52.

Figure 5B:
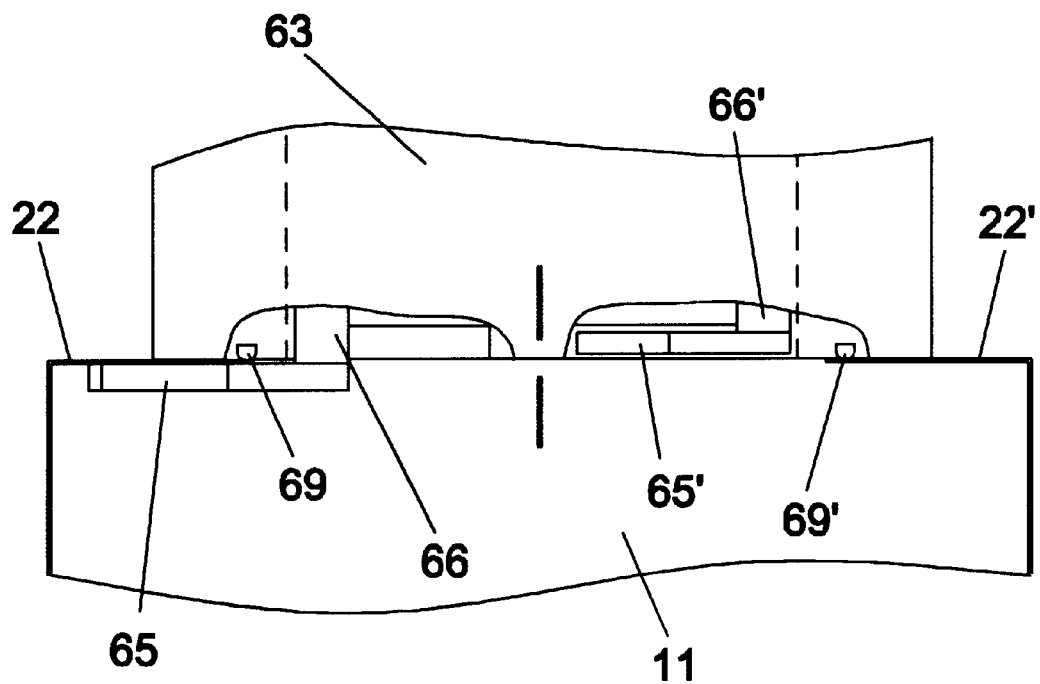

In FIG. 5b) a longitudinal section through a bag is shown in the filling position whereby the double-walled nozzle 63 as well as the bag 11 with the inwardly pointing second sealing flaps 22, 22' can be seen. On the double-walled nozzle 63 transverse seals 69, 69' are visible which run immediately outside and essentially parallel to the edge of the bag opening 15. In the left half of the drawing the support element 65 is shown in the position known and described in FIG. 4b) in which it supports the sealing flap 22 from below against the nozzle 63 pressed on from above. In the right half of the drawing, the support element 65' is shown in the position known and described in FIG. 4a) in which it is guided out of the bag area due to a rotating action of 180° and lifting of the trunnion 66. By lifting the nozzle 63 marginally the bag can be transported further. The area of the sealing flaps 22 lying outside the seals 69, 69' is again being kept free from filling products, i.e. in particular is dustfree. The transverse seals 69 connect to the longitudinal seals 68 such that a circumferential sealing line is created.

Figure 6A:
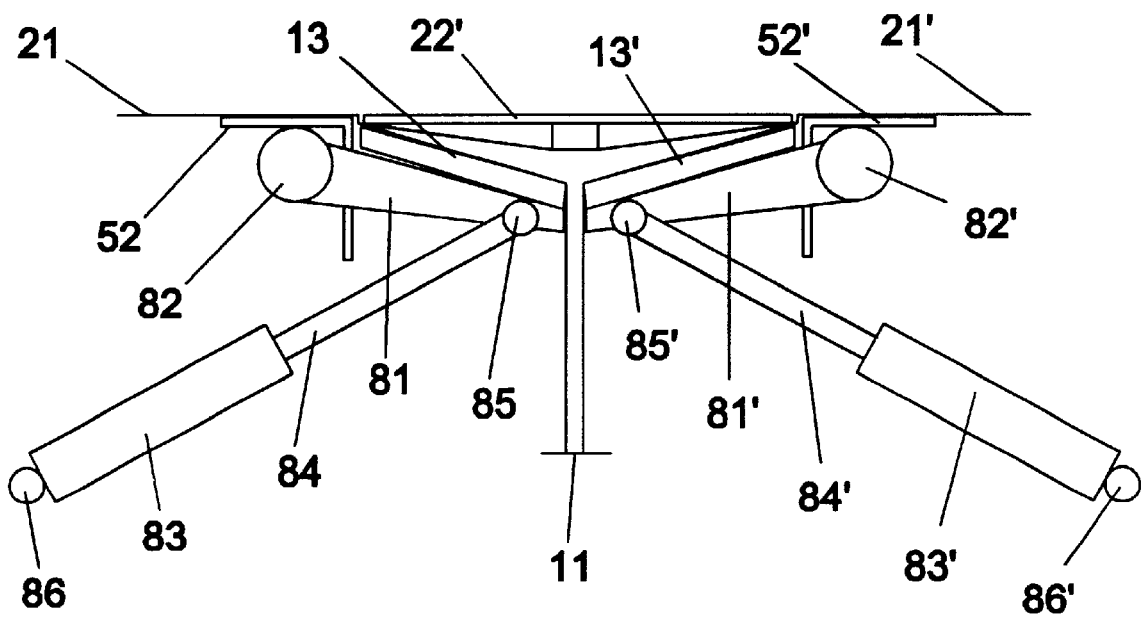
FIG. 6 shows further parts of the filling station according to FIG. 2b a) with deflectors in the position prior to the filling of the bag, b) with deflectors in the position after the start of the filling process of the bag.
Figure 6B:
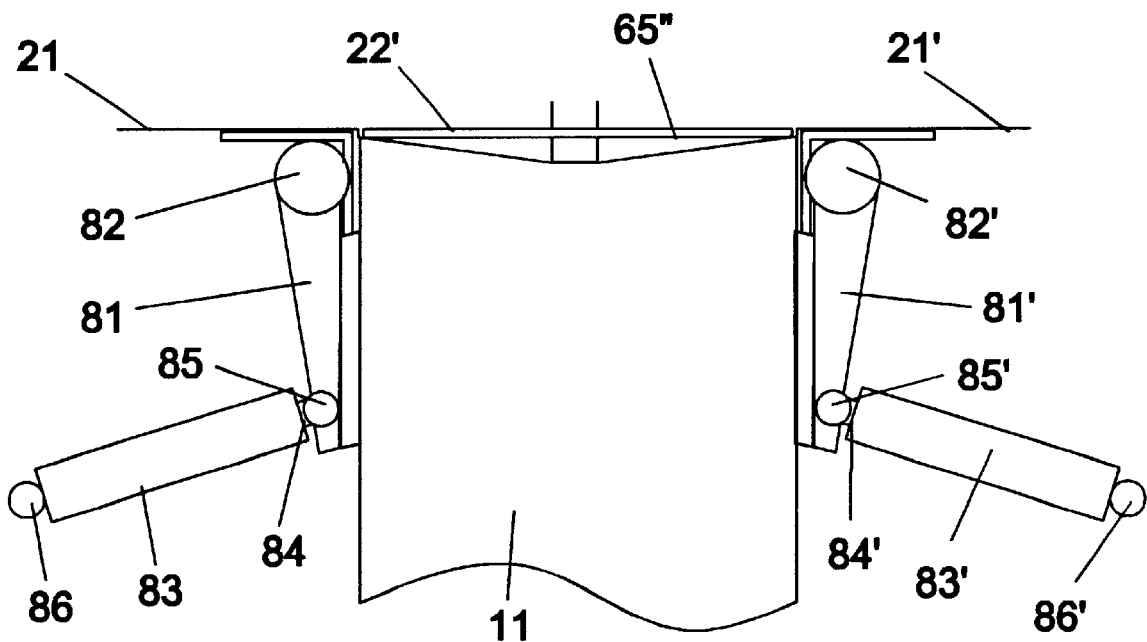

In FIG. 6 further details from the area of a filling station 51 are shown whereby for orientation purposes only the guide profiles 52, 52'are shown not however the pairs of conveyor lying sideways outside the guide profiles. In FIG. 6a) a bag is shown in a configuration as it is fed into the filling station, i.e. in particular with bag walls 1, 1' lying closely together, so that the body is flattened. The first sealing flaps 21, 21' are supported from below by the guide profiles 52, 52'. The areas of the sealing flaps 21, 21' protruding beyond are retained by the conveyor belts not shown here. Beneath the visible second sealing flaps 22 a support element 65" is shown whose underside is preferably slightly conically truncated. The strips 13, 13' of the bag body which are essentially still located on the level of the sealing collar are thereby slightly pushed in whereby they are supported from below by deflectors 81 being arranged in pairs. The deflectors 81, 81' feature a rotatable bearing arrangement around trunnions 82, 82' with horizontal rotational axes running in the direction of the guide profiles 51. The movement of the deflectors is dampened by the damper 83, 83' which act upon the free ends of the deflectors by means of their piston rod 84, 84' via pivot pins 85, 85', and which feature a swiveling bearing arrangement using pivot pins 86, 86'. If the entire filling quantity is released into the feeding hopper in the position shown in FIG. 5a) and falls onto the wall sections 13, 13' no tearing or destructive action can occur due to the support shown by means of the deflectors because the impact of the filling quantity is first of all captured by the deflectors 81, 81' softly giving way so that the filling product can only increasingly spread out the bag in a controlled fashion from top to bottom until the position shown in FIG. 5b is reached. For this the deflectors are perpendicular and lie parallel to the first bag walls 1, 1'. The filled bag can be transported further from this position towards a sealing station. A further bag which is still flattened can then be fed in. Afterwards the deflectors must again be returned to their original position by means of the damping elements 83, as well as the support elements 65 previously pulled back which must again be guided into the bag opening and positioned underneath the second sealing flaps.

In FIG. 7 a sheet stack 94 of cover sheets is shown in a) of which a first cover sheet 19 is indicated in a lifted off position. Above the sheet stack 94 a holding frame 95 is shown which can lift off a cover sheet and shift it sideways into a position in which a glue application can be carried out onto the cover sheet.

In b) a station with a double jet 96 and a single cover sheet which has glue on its underside is shown. The holding frame 95 can hold the cover sheet 19 in the position shown. The double jet 96 can be guided in a rectangle along the edges of the cover sheet if its longitudinal axis is kept parallel to it, thereby creating first glue beads 97 along the longitudinal edges and double-layered glue beads 98, 99 along the traverse edges.

In c) a sealing collar 16 with first sealing flaps 21 and second sealing flaps 22 is shown which respectively form dual fold sealing corners 7 at the corners. The sealing collar 16 encloses the bag opening 15 of the filled bag. With a slight clearance to the edge of the bag opening 15 the sealing line 55 is drawn in, outside which the sealing collar is kept dustfree during the bag filling process. Already during the manufacturing process of the bag sealing rails folded in double at the cut are placed on the second sealing flaps 22 whose crease edge runs along the inside of the bag opening 15, and which open to the outside in a V shape. A lower strip of these sealing rails 26 is glued or welded to the corresponding second sealing flaps 22, an upper strip is placed against the crease edge and can be swung out opposite the lower strip. It can be seen that the essential part of these sealing rails 26 lies outside the sealing line 55 and is therefore kept dustfree during the bag filling process.

In d) it can be seen that the cover sheet 19 is placed onto the bag opening 15. The first glue beads 97 are essentially glued to the first sealing flaps 21. The second glue beads 98 are glued to the upper strips of the sealing rails 26. Outside the sealing rails 26 the second glue beads 98 are immediately connected to the second sealing flaps 22.

In e) a vertical cross section through a bag is shown for which the cross section is carried out in lengthwise direction of the bag opening and the second sealing flaps 22 are folded inwards onto the bag body. Near the bag opening the twofold sealing rails 26 are indicated. First spline tools 91 can drive under the swung open upper strips of the sealing rails 26, as shown in the left drawing, whereas upper spline tools 92 which are especially shaped at the lower holding frame 95, can press the cover sheet 19 which is put on against them for gluing together the first glue bead 98. In order to press the second glue bead 99 to second sealing flaps 22 the first spline tool 91 must pulled back.

Variations of the material described herein are possible for the expert without leaving the scope of the invention.

LIST OF REFERENCE CHARACTERS 1 first bag wall
2 second bag wall
7 sealing gusset
8 bag seal
9 bag bottom
10 bag body
11 bag (finished)
12 opening (slot-shaped)
13 strips
14 final gusset
15 bag opening (rectangular)
16 sealing collar
17 sealing line
18 binding edge
19 cover sheet
20 glue edge
21 first sealing flap
22 second sealing flap
23 inner area
24 outer area
25 crease edge
26 sealing rail
31 feeder station
32 guide profile
33 conveyor belts
34 transfer section
41 testing station
42 supporting profile
43 conveyor belts
44 discharge roller
45 contact and sealing line
46 pressure joint
47 compressed air supply
48 longitudinal seal
49 transverse seal
51 filling station
52 guide profile
53 conveyor belts
54 contact line
55 sealing line
61 filler neck
62 feeding hopper
63 nozzle
64 contact edge
65 support element
66 trunnion
67 cross web
68 longitudinal seal
69 transverse seal
71 sealing station
72 guide profile
73 conveyor belts
81 deflectors
82 pivot pin
83 damper
84 piston rod
85 pivot pin
86 pivot pin
91 spline tool
92 spline tool
93 —
94 sheet stack
95 holding frame
96 double jet
97 glue bead
98 glue bead
99 glue bead

What is claimed is:

1. A method of transporting, testing, filling and sealing a bag, which comprises the steps of:

(i) providing a bag comprising a bag body in a flattened configuration, two wide first bag walls and two narrow second bag walls, a bag bottom for sealing the bag body at the bottom, a bag opening bordering the bag body at the top, and a bag seal comprising first sealing flaps connected to the first bag walls, second sealing flaps connected to the second bag walls, said first and second sealing flaps lie horizontally so that the first and second sealing flaps form a frame-shaped sealing collar;

(ii) transporting said bag from a feeder station to a testing station between parallel guide means adapted for supporting the horizontal bag flaps and the flattened bag body with oppositely disposed means for conveying said flattened bag through said guide means;

(iii) pressure testing said flattened bag at said testing station;

(iv) transporting said bag to a filling station from said testing station;

(v) filling said bag at said filling station; and (vi) transporting the bag from the filling station and sealing said bag at a sealing station.

2. A method according to claim 1, wherein said bag in said feeder station includes in the uppermost portion of said first bag walls strips which form a slot-shaped opening in said bag.

3. A method according to claim 2, wherein at the start of the transport in the feeder station said strips of the first bag walls and internal areas of said first sealing flaps are immediately supported from below at the first bag walls by said guide means which are stationary.

4. A method according to claim 3, wherein said guide means comprises perpendicular parallel support plates, said bag with a flattened configuration guided between said parallel support plates.

5. A method according to claim 4, wherein first bag walls are supported sideways in said testing station by said support plates with air supplied through said slot shaped bag opening.

6. A method according to claim 5, wherein the occurrence of a failure in the seal of said bag in said testing station, said support plates and means for conveying said bag become separated from each other enabling said bag to be discharged.

7. A method according to claim 1, wherein said first and second sealing flaps form a sealing collar for assisting in filling said bag in said filling station by contacting circumferentially said sealing collar with a filler neck means, said first and second sealing flaps supported from below.

8. A method according to claim 7, wherein during filling of the bag in the filling station, said first sealing flaps of said bag are supported by guide members.

9. A method according to claim 2, wherein during filling of said bag in the filling station, said first sealing flaps are supported from below by support elements positioned between the first sealing flaps and said strips.

10. A method according to claim 2, wherein filling of said bag is effected while the essentially flattened bag body maintains said slot-shaped opening, and said strips of the first bag walls in the plane of the sealing collar are supported from below.

11. A method according to claim 7, wherein filling the bag is held fast by the first sealing flaps and the bag body is suspended freely during the filling process.

12. A method according to claim 7, wherein said second sealing flaps are folded outwardly from the bag opening before the filler neck is placed on the sealing collar.

13. A method according to claim 7 including the step of placing a cover sheet onto said sealing collar and is connected therewith in an area located outside the area sealed by said filler neck means.

14. A method according to claim 13, wherein after placing the cover sheet onto the sealing collar the first sealing flaps are folded inwards and connected with each other.

15. A method according to claim 1, wherein said bag is expanded from a flattened configuration to an open configuration prior to filling in said filling station.

16. The method of claim 1, wherein the oppositely disposed means for conveying said flattened bag comprises pairs of conveyor belts.

17. The method of claim 1 wherein the feeder station supports the flattened bag by suspending from said guide means.

* * * * *